US009383006B2

(12) United States Patent
Otanez et al.

(10) Patent No.: US 9,383,006 B2
(45) Date of Patent: Jul. 5, 2016

(54) BINARY CLUTCH CONTROL DURING A ROLLING GARAGE SHIFT

(71) Applicant: GM GLOBAL TECHNOLOGY OPERATIONS LLC, Detroit, MI (US)

(72) Inventors: Paul G. Otanez, Troy, MI (US); Nathaniel E. Wilke, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 14/458,652

(22) Filed: Aug. 13, 2014

(65) Prior Publication Data
US 2016/0047466 A1     Feb. 18, 2016

(51) Int. Cl.
*F16H 59/44* (2006.01)
*F16H 61/04* (2006.01)
*F16H 61/686* (2006.01)

(52) U.S. Cl.
CPC ............ *F16H 61/0437* (2013.01); *F16H 59/44* (2013.01); *F16H 61/686* (2013.01); *F16H 2061/0462* (2013.01); *F16H 2061/0474* (2013.01); *F16H 2200/201* (2013.01); *F16H 2200/2038* (2013.01); *F16H 2200/2082* (2013.01); *F16H 2200/2094* (2013.01)

(58) Field of Classification Search
None
See application file for complete search history.

(56) References Cited

U.S. PATENT DOCUMENTS

| 2002/0187877 | A1* | 12/2002 | Skupinski | F16H 1/0437 477/115 |
| 2010/0063698 | A1* | 3/2010 | Lee | F16H 61/686 701/67 |
| 2013/0281246 | A1* | 10/2013 | Neelakantan | F16H 59/38 475/120 |

\* cited by examiner

*Primary Examiner* — Edwin A Young
(74) *Attorney, Agent, or Firm* — Quinn Law Group, PLLC

(57) ABSTRACT

A vehicle includes an engine, torque converter, and transmission assembly. The transmission assembly includes gear sets each having a plurality of nodes, an input member, a binary clutch connected to a node of one of the gear sets, friction clutches, and a controller. The controller detects a requested rolling garage shift of the transmission into a forward drive mode above a calibrated threshold absolute speed, and controls an amount of slip across a selected assisting clutch via modulation of pressure commands to the selected assisting clutch once the vehicle has slowed below the first calibrated threshold speed. The controller also stages the binary clutch to a calibrated staging pressure while controlling slip across the selected assisting clutch, and commands an engagement of the binary clutch and a release of the selected assisting clutch when a speed of the binary node reaches zero or a calibrated low non-zero speed.

19 Claims, 2 Drawing Sheets

BINARY CLUTCH CONTROL DURING A ROLLING GARAGE SHIFT

TECHNICAL FIELD

The present disclosure relates to the control of a binary clutch in a vehicle transmission during a rolling garage shift.

BACKGROUND

A motor vehicle transmission typically uses multiple gear elements and plate-type friction clutches to couple input and output members of the transmission, and to thereby establish a desired output speed ratio. A hydraulic clutch piston compresses the plates of one of the friction clutches to transfer torque across the clutch, or to stop rotation of a node or powertrain element connected to one side of the clutch. In this manner, gear elements/nodes that are connected to the clutch can be held stationary to act as reaction members for transferring torque through the powertrain. Friction clutches may fully-applied, fully-released, or controlled with a variable rate of slip anywhere in between these two clutch apply states.

In some vehicle transmissions, a binary clutch is used in lieu of a friction clutch for certain purposes, such as for shifting the transmission into $1^{st}$ gear low or reverse. Example binary clutches include dog clutches and selectable one-way clutches, the latter of which may use sprags, struts, or rollers to hold torque in one or two rotational directions as needed. Binary clutches may be used alone or in conjunction with rotating and/or braking friction clutches of the type noted above. Unlike conventional friction clutches, a binary clutch, as the name indicates, has only two possible clutch apply states, i.e., fully-applied and fully-released.

SUMMARY

A transmission is disclosed herein that includes one or more gear sets, plate-type friction clutches, and a binary clutch. The transmission includes an input member configured to receive input torque, for instance from an engine, an electric traction motor, or another prime mover. Each gear set has nodes, i.e., gear elements such as ring gears, sun gears, and planetary carriers. A node of at least one of the gear sets is connected to the binary clutch. In some embodiments, the binary clutch may also connect to a stationary member of the transmission, although other designs may position the binary clutch opposite a node of another gear set.

A transmission control module or other controller is in communication with the binary clutch and friction clutches. The controller automatically detects a requested shift of the transmission into a forward drive mode, usually $1^{st}$ gear, or into reverse from a relatively high absolute rate of vehicle speed, i.e., an absolute value of a positive or negative wheel speed or transmission output speed. When the requested shift is detected, such as by processing a park, reverse, neutral, drive, $1^{st}$ gear/low (PRNDL) shift signal from a PRNDL lever or a PRNDL control valve, the controller slows the speed of the node to which the binary clutch is attached, hereinafter referred to as a "binary node". This occurs specifically via pressure modulation of one or more of the friction clutches, hereinafter referred to as "assisting clutches". Such automatic pressure modulation stops the rotation of the binary node or sufficiently slows the binary node to below a low calibrated non-zero speed.

Once the binary node is slowed or stopped, the binary clutch is automatically applied via clutch control signals. The shift to the forward drive mode is completed. The assisting clutch(es) are then released, either immediately or according to a calibrated ramp profile depending on the embodiment.

A vehicle is also disclosed that includes, in addition to the transmission described above, an internal combustion engine and a hydrodynamic torque converter having an impeller/pump and a turbine. The engine is connected to the pump of the torque converter, and the input member of the transmission is connected to the turbine. Modulation of the pressure feeding the assisting clutch(es) is performed via the controller to modify a speed trajectory of the turbine.

A method is also disclosed for executing a requested rolling garage shift of the transmission into a forward drive mode or reverse from above a calibrated threshold absolute speed, i.e., above a calibrated positive speed or below a calibrated negative speed. The method includes automatically detecting the requested rolling garage shift, and then slowing a speed of a binary node of a gear set of the transmission to zero or to within a calibrated range of zero. This occurs via a controller using pressure modulation of a selected assisting clutch. The selected assisting clutch is one of the plurality of friction clutches noted above, and the binary node is a node of one of the gear sets of the transmission. The method also includes applying the binary clutch only when the speed of the binary node has slowed to zero or to within the calibrated range of zero. After this occurs, or concurrently, the controller releases the selected assisting clutch via clutch commands from the controller after applying the binary clutch.

The above features and the advantages of the present disclosure are readily apparent from the following detailed description of the best modes for carrying out the invention when taken in connection with the accompanying drawings.

DETAILED DESCRIPTION

Figure 1:
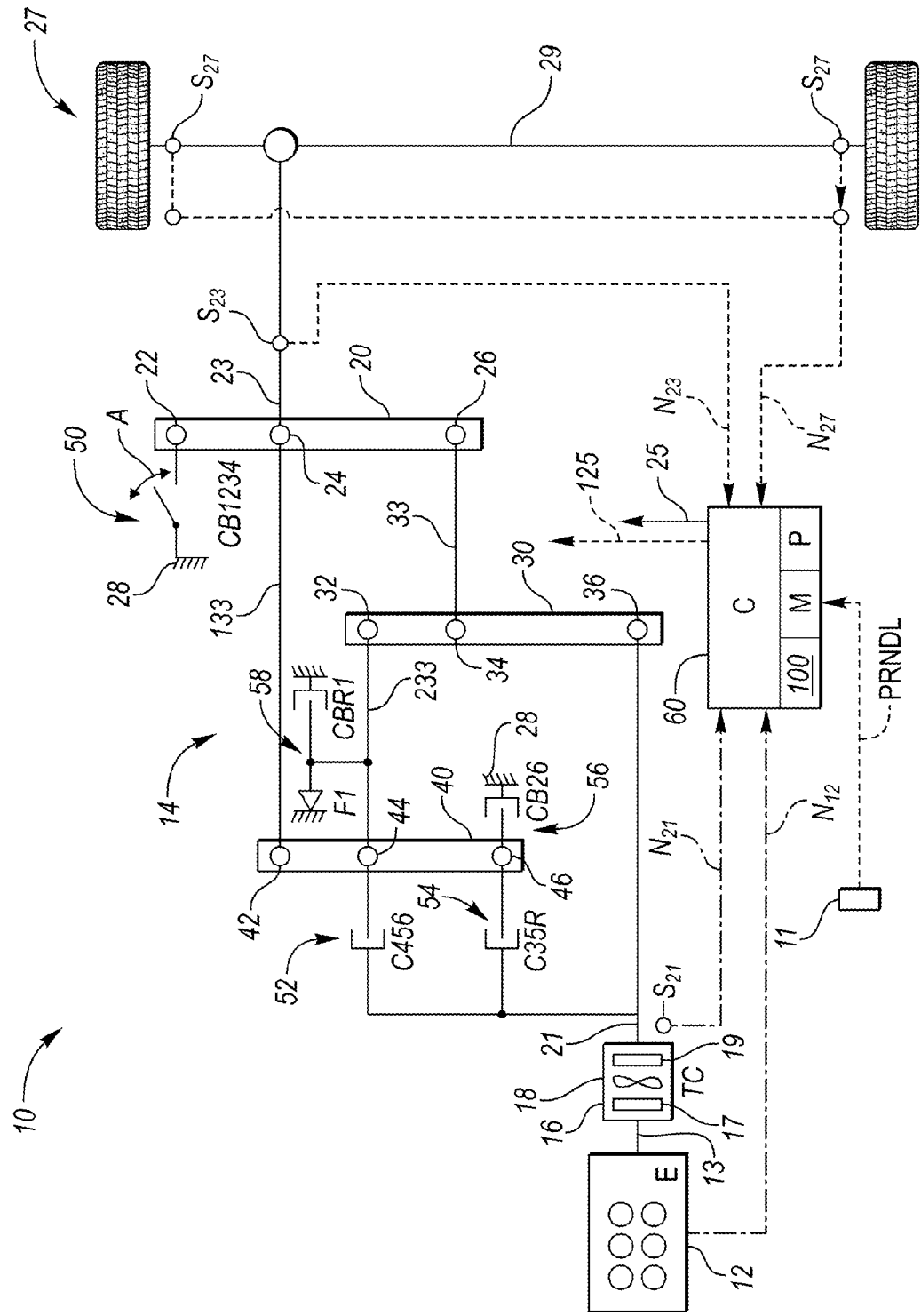
FIG. 1 is a schematic illustration of an example vehicle having an automatic transmission with a binary clutch, with the transmission controlled during a high-speed rolling garage shift via a controller as set forth herein.

Referring to the drawings, an example vehicle 10 is shown schematically in FIG. 1 that includes an internal combustion engine 12 and a transmission 14. A driveshaft 13 of the engine 12 is connected to an input member 21 of the transmission 14 via a hydrodynamic torque converter 16. The torque converter 16 includes an impeller/pump 17, a stator 18, and a turbine 19. The pump 17 is directly connected the driveshaft 13, and thus rotates at engine speed (arrow $N_{12}$). The turbine 19, which is directly connected to the input member 21, rotates at a turbine speed ($N_{21}$) that is less than or equal to engine speed ($N_{12}$). The degree of variance between engine speed ($N_{12}$) and turbine speed ($N_{21}$) depends on the state of a lockup clutch (not shown) disposed within the torque converter 16, which locks the impeller 17 and turbine 19 together above a threshold speed, as is known in the art. An output member 23 of the transmission 14 is connected to drive wheels 27 of the vehicle 10 via a drive axle 29.

The transmission 14 is shown in a schematic lever diagram format to include one or more gear sets, e.g., respective first, second, and third gear sets 20, 30, and 40 in the non-limiting example embodiment of FIG. 1. At least one node/gear element of the transmission 14 is connected to a binary clutch 50, which may be embodied as a dog clutch, a selectable one-way clutch, or any other clutch device having only the binary clutch apply states of fully-applied/engaged and fully-released/disengaged, as noted previously above. The transmission 14 additionally includes various plate-type friction clutches 52, 54, and 56, and may further include a selectable one-way clutch 58.

A controller 60 of the vehicle 10 of FIG. 1 is in communication with the binary clutch 50 and the various other clutches 52, 54, 56, and 58 of the transmission 14. The controller 60 is configured to detect a requested rolling garage shift of the transmission 14 through neutral from forward drive mode to reverse or from reverse to a forward drive mode at a high rate of absolute speed, whether a speed of the vehicle 10 as measured at the road wheels 27, the rotational speed of the output member 23, or both, e.g., as determined via speed sensors $S_{27}$ and/or $S_{23}$, respectively.

As used herein, the term "rolling garage shift" is any shift of the transmission 14 into a forward drive mode, typically $1^{st}$ gear low or $1^{st}$ gear, through neutral from forward drive or a reverse. Such a shift maneuver may be requested by a driver of the vehicle 10 via movement of a park, reverse, neutral, drive, low (PRNDL) lever 11 when the vehicle 10 is traveling above a threshold calibrated absolute rate of speed, i.e., above a calibrated positive rate of speed or below a calibrated negative rate of speed. A shift to forward drive from neutral or reverse requires engagement of the binary clutch 50 in the transmission 14 as shown, and therefore the present method 100 may be extended to any powertrain that uses a similar binary clutch or other binary device to enter $1^{st}$ gear.

However, the binary clutch 50 should not always be applied immediately upon request, due to the possibly of elevated vehicle speeds during certain rolling garage shift maneuvers. That is, the speed differential across the sides of the binary clutch 50 may be high at the moment the rolling garage shift is requested, such that an immediate engagement of the binary clutch 50 could place excessive force on any struts, sprags, rollers, or other torque holding elements of the binary clutch 50, and/or otherwise produce an unacceptably harsh or delayed rolling garage shift. The controller 60 handles this particular control problem via execution of instructions embodying the method 100, an example of which is described below with reference to FIGS. 2 and 3.

Additionally with respect to the transmission 14 shown in FIG. 1, the first gear set 20 may include first, second, and third nodes 22, 24, and 26, respectively, with the term "node" referring herein to a gear element such as a ring gear, a planetary carrier, or a sun gear. For instance, nodes 22, 24, and 26 may correspond to a sun gear, a planetary carrier, and a ring gear, respectively, in an example design. The second and third gear sets 30 and 40 may likewise have respective first, second, and third nodes. For the second gear set 30, the first, second, and third nodes are nodes 32, 34, and 36, respectively. The third gear set 40 includes respective first, second, and third nodes 42, 44, and 46. In the embodiment shown in FIG. 1, nodes 32, 34, and 36 may respectively correspond to a ring gear, a planetary carrier, and a sun gear. Nodes 42, 44, and 46 of the third planetary gear set 40 may likewise respectively correspond to a ring gear, a carrier, and a sun gear. Other gear set numbers or configurations may be envisioned without departing from the intended inventive scope.

The first node 22 is selectively connected to a stationary member 28 of the transmission 14 via the binary clutch 50 in the non-limiting example transmission 14. The output member 23 is connected to the second node 24, and thus the output member 23 and the binary clutch 50 are connected to different members of the same gear set 20 in this particular design. A first interconnecting member 33 directly and continuously connects the third node 26 to the second node 34 of the second planetary gear set 30. A second interconnecting member 133 directly and continuously connects the second node 24 of the first planetary gear set 20 to the first node 42 of the third planetary gear set 40.

The input member 21 of the transmission 14 of FIG. 1 is selectively connected to the second node 44 of the third planetary gear set 40 via operation of the friction clutch 52, and to the third node 46 via the friction clutch 54. The input member 21 is also directly connected to the third node 36 of the second planetary gear set 30 as shown. The third node 46 is also selectively connected to a stationary member 28 of the transmission 14 via clutch 56. The second node 44 of the third planetary gear set 40 is continuously connected to the first node 32 of the second planetary gear set 30 via a third interconnecting member 233, which in turn is connected to the stationary member 28 via the selectable one-way clutch 58. In this particular example configuration, the clutch 58 includes a braking clutch CBR1 and a freewheeling element F1, with the braking clutch CBR1 being applied only during engine braking. Thus, clutch 58 is not directly involved in the particular rolling garage shift maneuver that is controlled according to the method 100.

The binary clutch 50 and the various other clutches 52, 54, 56, and 58 are labeled in FIG. 1 with their active gear states and other indicators for added clarity. According to this convention, "C" refers generally to "rotating clutch", "B" refers to "braking clutch", and "R" and the various numerals "1-6" refer to the particular gear modes, e.g., reverse, "$1^{st}$ gear, $2^{nd}$ gear, etc., all the way up to $6^{th}$ gear for the non-limiting 6-speed example transmission 14. With the exception of the binary clutch 50 and the selectable one-way clutch 58, all of the clutches shown in FIG. 1 are hydraulically-actuated friction plate-type clutches of the type known in the art.

The controller 60 of FIG. 1 may be a transmission control module or other control device embodied as a digital computer and all necessary hardware and software. The controller 60 is in communication with the engine 12 or an engine control module (not shown), and with the PRNDL lever 11. The controller 60 thus knows or receives the engine speed (arrow $N_{12}$), the turbine speed (arrow $N_{21}$), and the PRNDL setting (arrow PRNDL) as part of the method 100, along with the measured wheel speeds (arrow $N_{27}$) and output speeds (arrow $N_{23}$) from the respective sensors $S_{27}$ and $S_{23}$. All speed sensors may be configured as Hall-effect sensors, accelerometers, or other suitable speed sensors. Therefore, the respective input and output speeds ($N_{21}$, $N_{23}$) may be either directly measured via physical sensors or derived from other speed-related values such as acceleration, wheel speed (arrow $N_{27}$), and the like.

The controller 60 selectively transmits clutch control signals (arrow 25) to selected clutches, e.g., the friction clutches 54 and 56, and binary clutch control signals (arrow 125) to the binary clutch 50, upon detection of a requested rolling garage shift, such as a movement of the PRNDL lever 11 into drive (D) or reverse (R) from the opposite direction of travel. The controller 60 then waits until an absolute speed of the vehicle 10, such as the wheel speed (arrow $N_{27}$) and/or the output speed ($N_{23}$), drops below a calibrated threshold absolute speed threshold, e.g., 3-5 MPH, before proceeding with the remainder of method 100. The binary clutch 50 is applied only when the transmission 14 is tied up, i.e., when all of the nodes of all of the gear sets 20, 30, 40 of the transmission 14 are at zero speed, or within a small calibrated margin of zero speed such as within less than 30-50 RPM, with the exact non-zero value largely depending on the structural integrity of the binary clutch 50 and any objective or subjective shift noise criteria.

The selected clutches 54 and 56, which are referred to herein as "assisting clutches", are controlled in the example configuration of FIG. 1 to generate the required trajectory to the turbine speed ($N_{21}$), and to ultimately tie up the transmission 14 so that the binary clutch 50 may be smoothly engaged with low noise and impact to the binary clutch 50. Optionally, the controller 60 may execute closed-loop control on the turbine speed ($N_{21}$), perhaps using the acceleration of the output member 23 as a control variable to further ensure a desired trajectory for turbine speed ($N_{21}$).

Structurally, the controller 60 may include a processor P along and memory M, some of which is non-transitory and tangible, e.g., magnetic or optical read-only memory (ROM), flash memory, and the like. The controller 60 may also include sufficient amounts of random access memory (RAM) and electrically programmable read only memory (EPROM), as well as a high-speed clock, analog-to-digital (A/D) and/or digital-to-analog (D/A) circuitry, input/output circuitry or devices, and signal conditioning and buffer circuitry, all of which is omitted from FIG. 2 for illustrative simplicity. Instructions for executing the method 100 are recorded in memory M and executed by the processor P to provide the control functionality of the transmission 14, which will now be described with reference to FIGS. 2 and 3.

Figure 2:
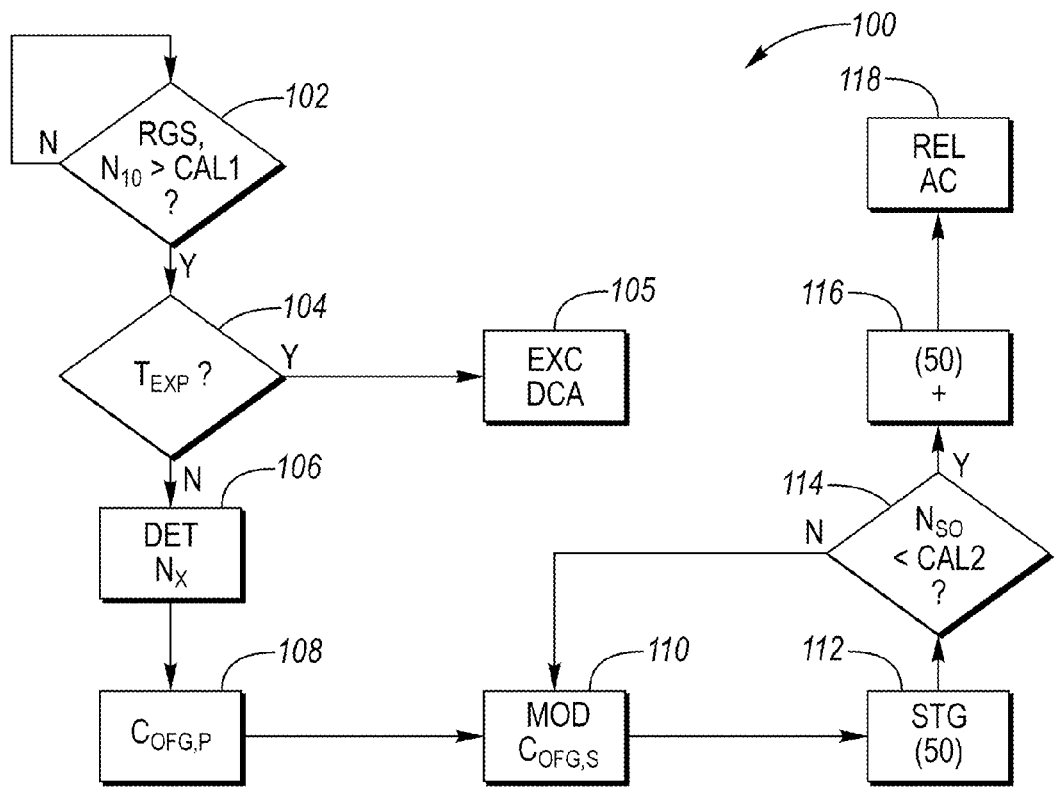
FIG. 2 is a flow chart describing an example method for controlling the transmission of FIG. 1 during a high-speed rolling garage shift.

Referring to FIG. 2 in conjunction with the structure of FIG. 1, the method 100 commences with step 102 with a detection of a requested gear shift (RGS) of the transmission 14 during a rolling garage shift from a relatively high rate of absolute speed. The high rate of absolute speed is associated with a calibrated first speed threshold (CAL 1) in memory M of the controller 60. For example, a threshold of 3-5 MPH or corresponding RPM may be used in terms of an absolute speed of the vehicle 10, whether measured in a positive or negative direction at the wheels 27 or at the output member 23. The requested rolling garage shift of the transmission 14 may be determined from the position of the PRNDL lever 11. More precisely, the requested rolling garage shift may be determined from a position of a PRNDL valve (not shown) that moves in response to movement of the PRNDL lever 11, as is well known in the art. The method 100 proceeds to step 104 when a requested rolling garage shift is detected above the first calibrated speed threshold.

Step 104 includes starting a timer and determining if the speed of the vehicle 10 from step 102 has dropped below the first calibrated speed threshold. The vehicle 10 will begin to slow, absent a steep decline or downward grade, due to inertia and road friction. However, in rare cases the grade may be steep such that the vehicle 10 continues to roll downhill. In such a case, the timer will expire ($T_{EXP}$) without the vehicle 10 first slowing below the first calibrated speed threshold of step 102. The method 100 proceeds to step 105 if this result should occur. Otherwise, the method 100 proceeds to step 106.

Step 105 includes executing a default control action (EXC DCA). Step 105 could entail temporarily preventing a shift of the transmission 14 by ignoring the requested rolling garage shift so as to protect the binary clutch 50, or simply waiting for the driver of the vehicle 10 to apply the brakes in the usual manner. The method 100 is finished once step 105 has been executed.

At step 106, the controller 60 next determines various speed values (DET $N_X$) for further control of the transmission 14. The speed values determined as part of this step may include the input and output speeds $N_{21}$ and $N_{23}$, respectively.

Step 106 may include receiving the speed signals $N_{21}$ and $N_{23}$ from the sensors $S_{21}$ and $S_{22}$. As part of step 106, the controller 60 also derives the speed of the node(s) to which the binary clutch 50 is connected, i.e., the "binary node". The speed of the binary node, which is the first node 22 of the first gear set 20 in the example transmission 14 shown in FIG. 1, may be derived from the known design of the transmission 14 via the input and output speeds $N_{21}$ and $N_{23}$, i.e., given the lever diagram and gear ratios of the transmission 14.

For example, the controller 60 may calculate the speed of the binary clutch 50, or rather its slip speed $N_{50}$, as follows:

$$N_{50} = N_{23}\left(1 + \frac{R_1}{S_1}\right) - N_{21}\left(\frac{R_{21}}{S_1}\right)\left(\frac{S_2}{S_2 + R_2}\right)$$

where $R_1$, $R_2$, $S_1$, and $S_2$ are, for the example configuration of FIG. 1, the ring gear and sun gear sizes used to calculate the gear ratios. Note that in the embodiment of FIG. 1, node 22 is connected on one side to the stationary member 28, and therefore the measured speed of the binary clutch 50 is the slip speed across the binary clutch 50. In other embodiments the binary clutch 50 may be disposed between two nodes. The method 100 proceeds to step 108 once the speeds have been determined.

At step 108, the controller 60 may command a quick and full engagement of an assisting clutch, e.g., the primary off-going clutch ($C_{OFG,P}+$), which in the example of FIG. 1 is clutch 56. Clutch 56 is a braking clutch connecting the third node 46 of the third gear set 40 to the stationary member 28. This action locks node 46 to the stationary member 28, thereby stopping rotation of node 46 and allowing node 46 to act as a reaction element for input torque into the transmission 14. The method 100 then proceeds to step 110.

At step 110, the controller 60 of FIG. 1 initiates slip control of the secondary offgoing clutch, which in the example of FIG. 1 is clutch 54. As part of step 110, the controller 60 modulates pressure commands to clutch 54 via the clutch control signals (arrow 25) to enforce a desired trajectory of the input/turbine speed ($N_{21}$). Therefore, step 110 is abbreviated "MOD $C_{OFG,S}$" in FIG. 2 for clarity. As is known in the art, plate-type clutches used in conventional transmissions are pressure-controlled devices, and therefore the controller 60 can transmit the clutch control signals (arrow 25) to any hydraulic pressure or flow control solenoids (not shown) as needed to cause a specific level of engagement, and thus slip, to occur across the clutch 54. As step 110 commences, the method 100 proceeds to step 112.

Step 112 includes staging the binary clutch 50, a step abbreviated as "STG (50)" in FIG. 2. Step 112 includes moving the binary clutch 50, e.g., by transmitting the binary clutch commands (arrow 125) to set the binary clutch 50 to a calibrated staging position. As is known in the art, a binary clutch 50 may have races or torque transmitting pieces which move toward each other when engagement is required, and away from each other when release is required. Step 112 is executed to set the binary clutch 50 into a "ready state", without engagement, so that later in the method 100, a commanded application or engagement of the binary clutch 50 occurs immediately upon request by the controller 60, i.e., without having to wait for the binary clutch 50 to reach the staging position. The method 100 proceeds to step 114 once the binary clutch 50 is sufficiently staged.

Step 114 includes determining, again via the controller 60, whether the speed of the binary clutch 50 is below a second calibrated threshold ($N_{50}$<CAL 2). Steps 110 and 114 are repeated in a closed-loop until the speed of the binary clutch 50 is below a second calibrated threshold, i.e., the speed of the binary node or node 22 in FIG. 1, at which point the method 100 proceeds to step 116.

During the closed-loop control interval in step 116, the controller 60 may periodically or continuously modulate the pressure to the clutch 54 via the clutch control signals (arrow 25) in a manner that causes a calibrated ramp to occur in turbine speed (arrow $N_{21}$). In some embodiments, the controller 60 may consider the acceleration of the output member 23 as a variable in increasing or decreasing the rate of the turbine speed (arrow $N_{21}$). That is, if the output member 23 accelerates too quickly, which in this context actually refers to negative acceleration/deceleration, the controller 60 can command less pressure to the clutch 54 so as to increase the turbine speed (arrow $N_{21}$), and vice versa.

Step 116 includes applying the binary clutch 50. As the binary clutch 50 was previously staged at step 112, step 116 occurs almost immediately upon receipt by the binary clutch 50 of the binary clutch control signals (arrow 125). Step 116 results in any torque-holding elements of the binary clutch 50, e.g., teeth of a dog clutch or struts of a selectable one-way clutch, fully engaging so as to hold torque in the required direction(s). The method 100 then proceeds to step 118.

Step 118 includes releasing the assisting clutches (REL AC) used to slow or stop the binary node in the prior steps. The rapidity of the release may affect the shift feel. Therefore, in an optional approach the controller 60 may release the assisting clutches, here clutches 54 and 56, according to a calibrated ramp rate. By slowly releasing the assisting clutches, the feel of the shift may be tuned so that is it imperceptible to the driver. However, in some designs it may be desirable to provide some degree of feedback to the driver, such as a mild amount of noise or shift bump, to inform the driver that the transmission 14 has completed its shift. Thus, step 118 may include immediately or slowly releasing the assisting clutches used to tie up the transmission 14 in the course of executing method 100.

Figure 3:
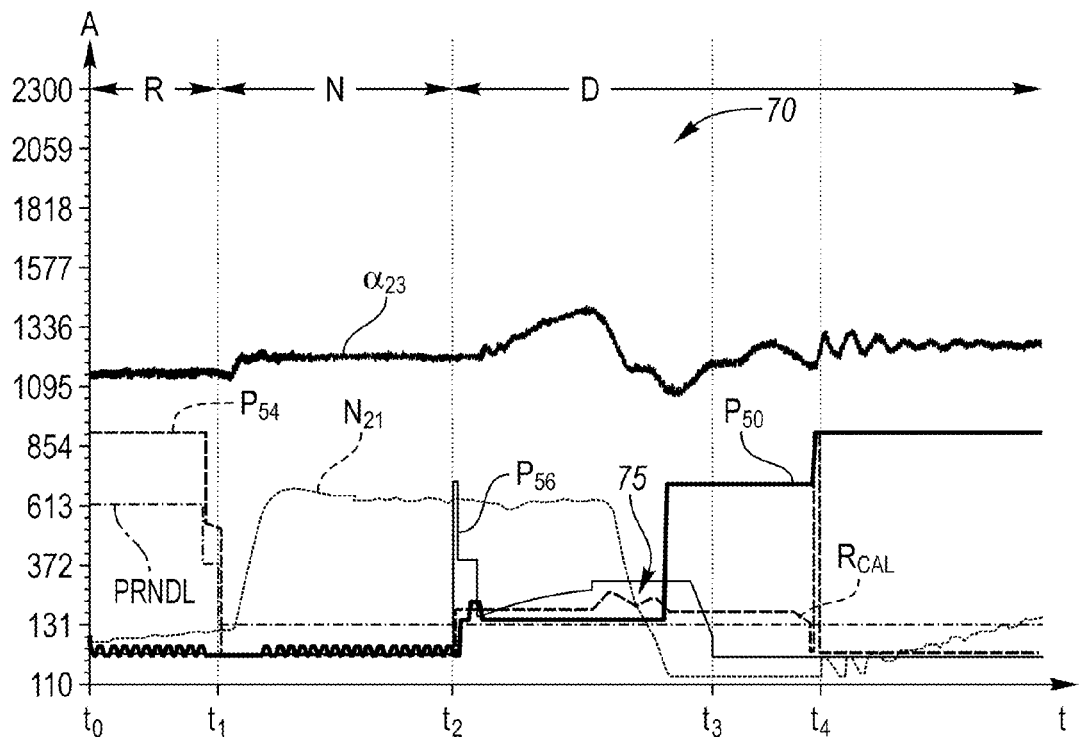
FIG. 3 is an example time plot of a set of vehicle parameters controlled as part of the method shown in FIG. 2.

Referring to FIG. 3, an example set of vehicle parameters 70 is shown to further illustrate the general effect of the method 100 on the powertrain of the vehicle 10 shown in FIG. 1. Time (t) is depicted on the horizontal axis, and signal amplitude (A) is depicted on the vertical axis. In this non-limiting embodiment, the vehicle 10 is traveling in reverse (R) at $t_0$ at a relatively high rate of speed, for instance 3-5 MPH.

At about $t_1$, the driver of the vehicle 10 moves the PRNDL lever 11 to drive (D), as indicated by trace PRNDL, thereby requesting an example rolling garage shift from reverse to drive. The transmission 14 immediately shifts itself into neutral (N) at $t_1$, and remains there until $t_2$ as the timer initiated at step 104 waits for the vehicle 10 to slow below the first calibrated speed threshold of step 102. The release of the clutch 54, which is clutch C35R in the example embodiment of FIG. 1, is required to exit reverse. The drop in clutch pressure (trace $P_{C35R}$) at $t_1$ shows the release of this assisting clutch.

As clutch 54 is released, turbine speed (trace $N_{21}$) increases beginning at $t_1$. The output member 23 may also begin to accelerate at this point, as shown via the trace $\alpha_{23}$. At about $t_2$, the controller 60 commences pressure modulation of the clutch 54, as indicated by the rising trace $P_{C35R}$ in region 75. The effect of such pressure modulation is shown on the speed of binary clutch 50 (trace $N_{50}$). At about $t_3$, the speed of the binary node begins to decrease, ultimately reaching zero or a calibrated low non-zero speed such as 30-50 RPM at about $t_4$. At this point, the controller 60 transmits the binary clutch control commands (arrow 125) to the binary clutch 50 to apply the pre-staged binary clutch 50. The controller 60 also transmits clutch control commands (arrow 25) to the applied or modulated assisting clutches, e.g., clutches 54 and 56, to fully release these clutches, thereby completing the shift to drive (D). As noted above, the release may be immediate, which can provide a desired shift bump or feel in the way of feedback to the driver, or the controller 60 can be programmed with a calibrated ramp rate ($R_{CAL}$) to gradually release the assisting clutches over a period of time to provide the desired level of shift feel. The same approach may be used for a rolling garage shift from drive to reverse, as will be appreciated by one of ordinary skill in the art.

Using the controller 60 and the method 100 enables any assisting clutches, usually the primary and secondary offgoing clutches of a given transmission, to control the speed of the binary clutch 50 to a zero or low non-zero speed. For a high-speed rolling garage shift, the assisting clutches, e.g., clutches 54 and 56, are controlled to smoothly and quickly tie up the transmission 14, thus stopping the output member 23, and specifically slowing or stopping any nodes to which the binary clutch 50 is connected. The closed-loop feedback control provided by the controller 60 enables this to be done in a manner that optimizes the feel of the shift, while also protecting the structural integrity of the binary clutch 50.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine;
a torque converter having a turbine and a pump, wherein the pump is directly connected to the engine; and
a transmission assembly having:
a plurality of gear sets each having a plurality of nodes, wherein the nodes are gear elements selected from the group consisting of a ring gear, a sun gear, and a planetary carrier;
an input member that is directly connected to the turbine;
a binary clutch connected to a node of one of the plurality of gear sets, wherein the node to which the binary clutch is connected is a binary node;
a plurality of friction clutches; and
a controller in communication with the binary clutch and the plurality of friction clutches, wherein the controller includes a processor and memory on which is recorded instructions for controlling the transmission during a requested rolling garage shift into a forward drive mode or a reverse mode from above a calibrated threshold absolute speed, wherein the controller is programmed to:
detect the requested rolling garage shift;
control an amount of slip across a selected assisting clutch via modulation of a pressure command to the selected assisting clutch when the vehicle has slowed below the calibrated threshold absolute speed, wherein the selected assisting clutch is one of the plurality of friction clutches;
stage the binary clutch while controlling the amount of slip across the selected assisting clutch, including moving the binary clutch to a calibrated staging position; and
command an engagement of the binary clutch and a release of the selected assisting clutch when a speed of the binary node reaches zero or a calibrated low non-zero speed.

2. The vehicle of claim 1, wherein the binary clutch is a dog clutch.

3. The vehicle of claim 1, wherein the transmission includes a stationary member, and wherein the binary clutch is a braking clutch connecting the binary node to the stationary member.

4. The vehicle of claim 1, wherein the plurality of gear sets includes first, second, and third gear sets, the selected assisting clutch is a rotating clutch that connects a node of the second gear set to a node of the third gear set, and the binary node is a node of the first gear set.

5. The vehicle of claim 1, wherein the calibrated threshold absolute speed is between 3-5 MPH.

6. The vehicle of claim 1, wherein the controller is programmed with a calibrated ramp rate, and is operable to release the selected assisting clutch according to the calibrated ramp rate.

7. A transmission comprising:
an input member;
a plurality of gear sets, each having a plurality of nodes, wherein the nodes are gear elements selected from the group consisting of a ring gear, a sun gear, and a planetary carrier;
a plurality of friction clutches;
a binary clutch connected to a binary node, wherein the binary node is one of the plurality of nodes;
a controller in communication with the binary clutch and the plurality of friction clutches, wherein the controller includes a processor and memory on which is recorded instructions for executing a rolling garage shift of the transmission into a forward drive mode or reverse drive mode from above a calibrated threshold absolute speed, and wherein execution of the instructions causes the controller to:
automatically detect the requested rolling garage shift;
slow a speed of the binary node to zero or to within a calibrated range of zero via pressure modulation of a selected assisting clutch, wherein the selected assisting clutch is one of the plurality of friction clutches;
apply the binary clutch only when the speed of the binary node has slowed to zero or to within the calibrated range of zero; and
release the selected assisting clutch after applying the binary clutch.

8. The transmission of claim 7, wherein the controller is programmed to release the selected assisting clutch according to a calibrated ramp profile after applying the binary clutch.

9. The transmission of claim 7, wherein the controller is programmed to immediately release the selected assisting clutch after applying the binary clutch.

10. The transmission of claim 7, wherein the binary clutch is a dog clutch.

11. The transmission of claim 10, wherein the transmission includes a stationary member, and wherein the dog clutch is a braking clutch connected to the binary node and to the stationary member of the transmission.

12. The transmission of claim 7, further comprising an output member, wherein the nodes of one of the plurality of gear sets include the binary node and a node that is connected to the output member.

13. The transmission of claim 7, wherein the plurality of friction clutches includes a braking clutch connected to the same node as the selected assisting clutch, and wherein the controller is programmed to fully apply the braking clutch while modulating the pressure to the selected assisting clutch.

14. A method for executing a requested rolling garage shift of a transmission having a binary clutch, a plurality of friction clutches, and a plurality of gear sets into a forward drive mode or a reverse mode from above a calibrated threshold absolute speed, wherein each of the gear sets includes a plurality of nodes in the form of gear elements selected from the group consisting of a ring gear, a sun gear, and a planetary carrier, the method comprising:
automatically detecting the requested rolling garage shift;
slowing a speed of a binary node of one of the plurality of gear sets of the transmission to zero or to within a calibrated range of zero via a controller using pressure modulation of a selected assisting clutch, wherein the selected assisting clutch is one of the plurality of friction clutches, and wherein the binary node is a node of one of the plurality of gear sets of the transmission to which the binary clutch is connected;
applying the binary clutch only when the speed of the binary node has slowed to zero or to within the calibrated range of zero; and
releasing the selected assisting clutch via clutch commands from the controller after applying the binary clutch.

15. The method of claim 14, wherein automatically detecting the requested rolling garage shift includes detecting a position of a park, reverse, neutral, drive, low (PRNDL) lever.

16. The method of claim 14, wherein releasing the selected assisting clutch occurs according to a calibrated ramp profile.

17. The method of claim 14, wherein slowing a speed of the binary node further includes fully engaging a braking clutch of the transmission, and wherein the braking clutch is one of the plurality of friction clutches.

18. The method of claim 14, wherein applying the binary clutch includes connecting the binary node to a stationary member of the transmission.

19. The method of claim 14, wherein the calibrated range of zero is less than 50 RPM.

* * * * *